United States Patent [19]
Clanton et al.

[11] Patent Number: 5,945,235
[45] Date of Patent: Aug. 31, 1999

[54] BATTERY HOLDER

[75] Inventors: David E. Clanton, New Egypt; John R. Bopp, Hazlet; Louis O. D'Anjou, Tinton Falls; Matthew J. Gawron, Freehold; Steve O. Mak, Leonardo; Manuel G. Orellana, Long Valley; Robert S. Randall, Rumson; John C. Smith, Elberon; Paul J. Yuhas, Bricktown, all of N.J.

[73] Assignee: Lucent Technologies Inc., Murray Hill, N.J.

[21] Appl. No.: 08/901,585

[22] Filed: Jul. 28, 1997

[51] Int. Cl.⁶ .................................................. H01M 2/10
[52] U.S. Cl. ............................. 429/98; 429/100; 429/99
[58] Field of Search .................................. 429/96, 97, 98, 429/99, 100

[56]  References Cited

U.S. PATENT DOCUMENTS

| | | | |
|---|---|---|---|
| 4,146,682 | 3/1979 | Nakao | 429/97 |
| 4,806,440 | 2/1989 | Hans, Jr. et al. | 429/121 |
| 5,217,824 | 6/1993 | Womak | 429/96 |
| 5,654,870 | 8/1997 | Havener | 361/600 |
| 5,663,011 | 9/1997 | Bunyea et al. | 429/97 |
| 5,670,267 | 9/1997 | Lee | 429/9 |

*Primary Examiner*—Maria Nuzzolillo
*Assistant Examiner*—Carol Chaney

[57]  ABSTRACT

A holder for a pair of cylindrical battery cells includes a carrier which retains the batteries in parallel side-by-side relationship and in series electrical connection. The cells are installed into a housing longitudinally and the housing is formed with guide channels for guiding and substantially surrounding the cells. At the ends of the guide channels, there are provided contact elements for electrically connecting the battery cells to circuitry. Electric shock hazard to a user is eliminated because the internal contact elements are inaccessible to the operator, even when the carrier is removed from the housing.

12 Claims, 4 Drawing Sheets

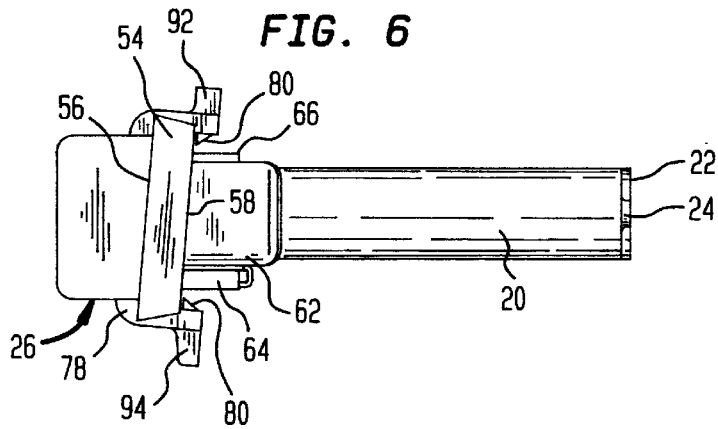
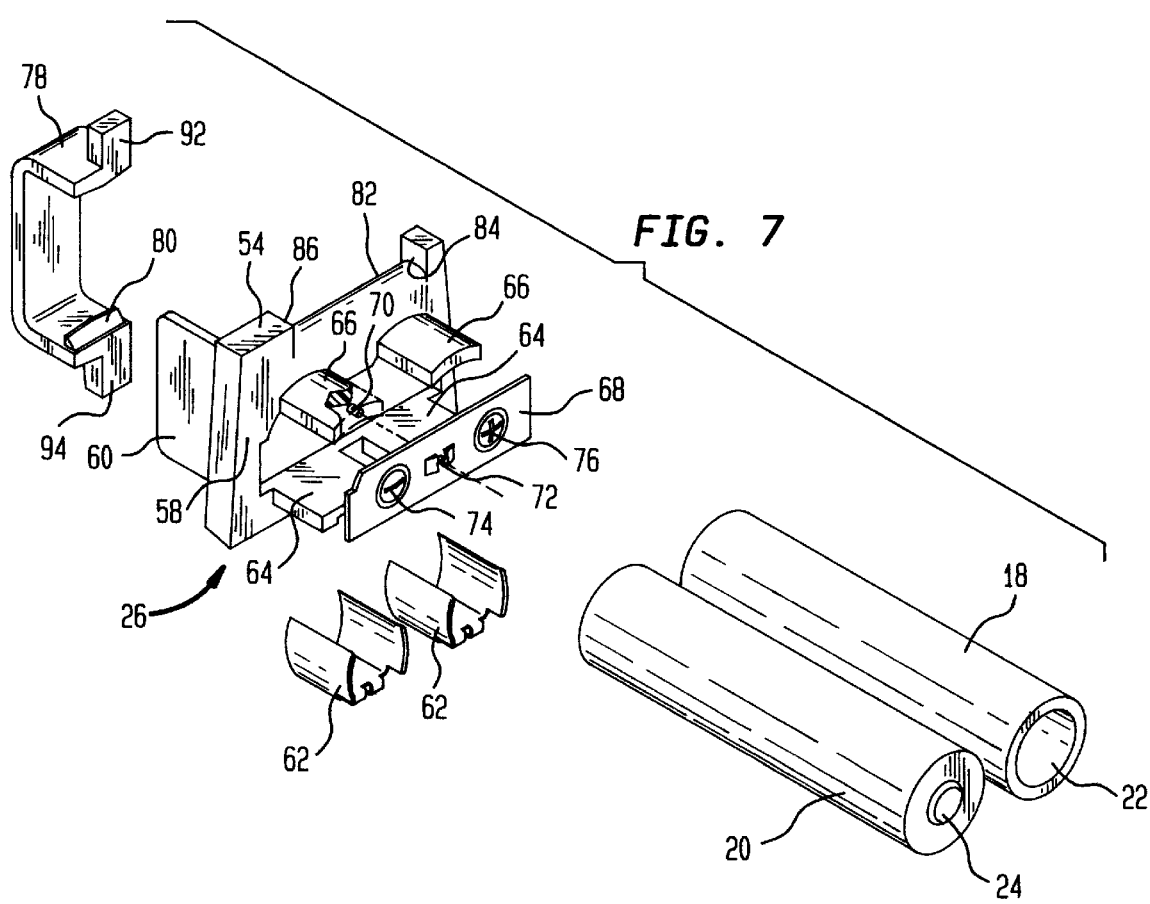

BATTERY HOLDER

BACKGROUND OF THE INVENTION

This invention relates to battery holders and, more particularly, to a battery holder which allows a battery cell to be easily inserted into or removed from a housing while eliminating electric shock hazards to the user.

Many electronic systems which are powered from an external source also include an internal backup power source, typically one or more battery cells, to insure that internal memory settings are not erased in the event of failure of the external power source. One such type of electronic system is a telecommunications module used by small businesses to provide telephone service for the business at a particular location. Such a module includes an internal random access memory (RAM) for storing information unique to that business location such as, for example, telephone numbers for use in speed dialing. In the event of a total loss of power, the module would have to be reprogrammed.

In the past, many of these modules were provided with backup batteries that were permanently secured, as by soldering, to the printed wiring boards within the module enclosure. For servicing of these backup batteries, the printed wiring board would be removed from the enclosure and returned to the factory or service area, and a replacement board would be installed and programmed. Such servicing is therefore very time consuming and expensive. It would therefore be desirable to provide such an electronic system with backup batteries that are readily available from commercial sources and that are easily replaced by the user.

Since the purpose of providing backup batteries is to insure that the memory is not erased due to loss of power from the external source, changing of the batteries should be effected without the system being powered down. However, Underwriters Laboratory requires that there be no potential electric shock hazard to a user when replacing the batteries, as set forth in standard UL1950. Since an internal fault in the module could put a high voltage on the internal battery terminals, past practice required that the system be powered down in order to satisfy UL standards when replacing backup batteries. It would therefore be desirable to provide an arrangement whereby the backup batteries are readily separable from the internal battery terminals for replacement purposes and access to the internal battery terminals is severely restricted when the batteries are removed from the module so that the module can continue to be powered.

SUMMARY OF THE INVENTION

The present invention provides, in combination, circuitry powered from a power source and a battery holder for holding at least one battery cell to supply backup power to the circuitry in the event of failure of the power source. The battery holder has internal terminals for connecting the battery cell to the circuitry and a cover for attaching the battery cell thereto. The cover is selectively settable into a latching state and a releasing state. When the cover is in the latching state the battery cell is in contact with the internal terminals and when the cover is in the releasing state the cover and the battery cell are removable from the battery holder to effect replacement of the battery cell while the circuitry continues to be powered from the power source.

In accordance with an aspect of the present invention, there is provided a battery holder adapted to hold at least one battery cell having a pair of terminals of opposite polarity. The holder comprises a housing and a battery carrier. The housing includes an exterior wall having an access opening sized to allow the battery cell to pass therethrough in a longitudinal direction, and interior support structure defining a guide channel for guiding and substantially surrounding the battery cell when the battery cell is within the housing. The housing also includes an interior wall situated inwardly of the interior support structure and providing an inner limit to longitudinal travel of the battery cell, and a pair of conductive contact elements mounted to the interior wall. Each of the pair of contact elements is adapted to be in electrical contact with a respective terminal of a battery cell. The battery carrier retains the battery cell and covers the access opening. The carrier includes a generally planar cover wall complemental to the access opening and having a pair of opposed major surfaces, a handle secured to a first of the cover wall major surfaces, and at least one clip member secured to the other of the cover wall major surfaces. Each clip member is resilient and at least partially surrounds a respective battery cell to frictionally engage and retain the respective battery cell. The carrier further includes a latch member movably mounted on the cover wall. The latch member and the housing exterior wall surrounding the access opening are formed with cooperating structure so that a) when the latch member is moved to a first position relative to the cover wall the carrier is free to move in and out of the access opening with the battery cell moving along the guide channel so that the battery cell can be inserted into or removed from the housing and b) when the latch member is moved to a second position relative to the cover wall the latch member and the cooperating structure of the housing exterior wall interfere to prevent the battery cell from being inserted into or removed from the housing.

In accordance with another aspect of this invention, each of the contact elements mounted to the interior wall includes a spring to yieldably bias the battery cell in a direction longitudinally outward from the housing.

In accordance with a further aspect of this invention, the at least one battery cell comprises a pair of cylindrical battery cells each having a respective pair of terminals of opposite polarity at longitudinally opposite ends thereof. The carrier retains the pair of battery cells in side-by-side relationship and the at least one clip member comprises a pair of clip members. The carrier further includes a conductive contact plate secured to the cover wall other major surface between the pair of clip members and the cover wall other major surface. The contact plate extends sufficiently across the pair of clip members to engage and interconnect the outward terminals of a pair of battery cells retained by the pair of clip members so that the pair of battery cells are in series electrical connection.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 6 is a side view of the carrier shown in FIG. 5; and

FIG. 7 is an exploded perspective view of the carrier shown in FIG. 5.

DETAILED DESCRIPTION

Figure 1:
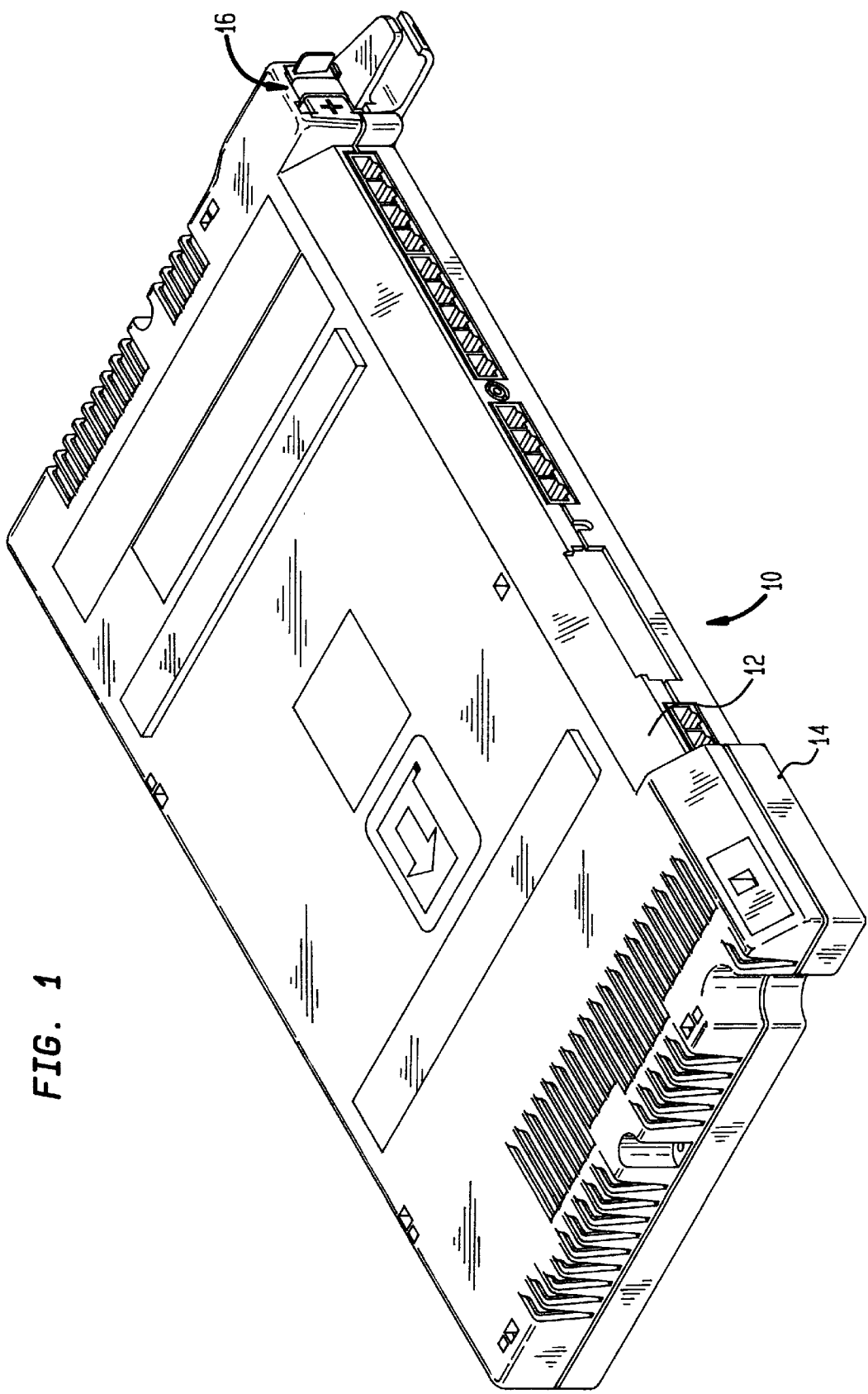
FIG. 1 is a perspective view of a telecommunications module including a battery holder constructed in accordance with the principles of this invention.

Referring now to the drawings, FIG. 1 shows a telecommunications module, designated generally by the reference numeral 10, which includes a battery holder constructed in accordance with the principles of this invention. The housing of the module 10 is formed of an upper housing part 12 and a lower housing part 14 joined along a plane, as is conventional. At this point, it is to be noted that use of the terms "upper" and "lower", as well as any other terms designating direction or orientation, only apply to the embodiment illustrated herein and its particular orientation shown in the drawings, it being contemplated that the battery holder in accordance with this invention may be constructed and used in other orientations, and the use of specific directional and orientational terms is not to be considered limiting other than as denoting relative directions and orientations within the inventive battery holder.

Within the module 10 are one or more printed wiring boards (not shown) including electronic components and wiring for interconnecting various individual telephone stations and central office telephone lines which are connected to the module 10. The module 10 is also connected to commercially available AC power, via a conventional power outlet and line cord (not shown), for providing power to the circuitry on the printed wiring boards. At least one of the printed wiring boards contains random access memory for storing information unique to the particular module 10. This memory needs to be powered continuously in order to retain the information. Accordingly, to provide such power in the event of a loss of power from the commercial source, a battery holder is provided for containing backup battery cells. This battery holder, designated generally by the reference numeral 16, is illustratively in the far right corner of the module 10, as shown in FIG. 1.

The inventive battery holder 16 is designed to utilize commercially available off-the-shelf battery cells, which can be purchased at numerous convenient locations. In a preferred embodiment, the battery cells are cylindrical, such as type AAA cells, and a pair of such cells are utilized. Accordingly, the holder 16 is designed to hold a pair of such cells 18, 20, in series electrical connection to provide a source of backup power for the random access memory of the module 10. As is conventional, each of the battery cells 18, 20 has a respective pair of terminals of opposite polarity at longitudinally opposite ends thereof. Thus, each of the cells has a substantially planar negative terminal 22 at one end and a boss-like positive terminal 24 at the other end (see FIG. 5).

Figure 2:
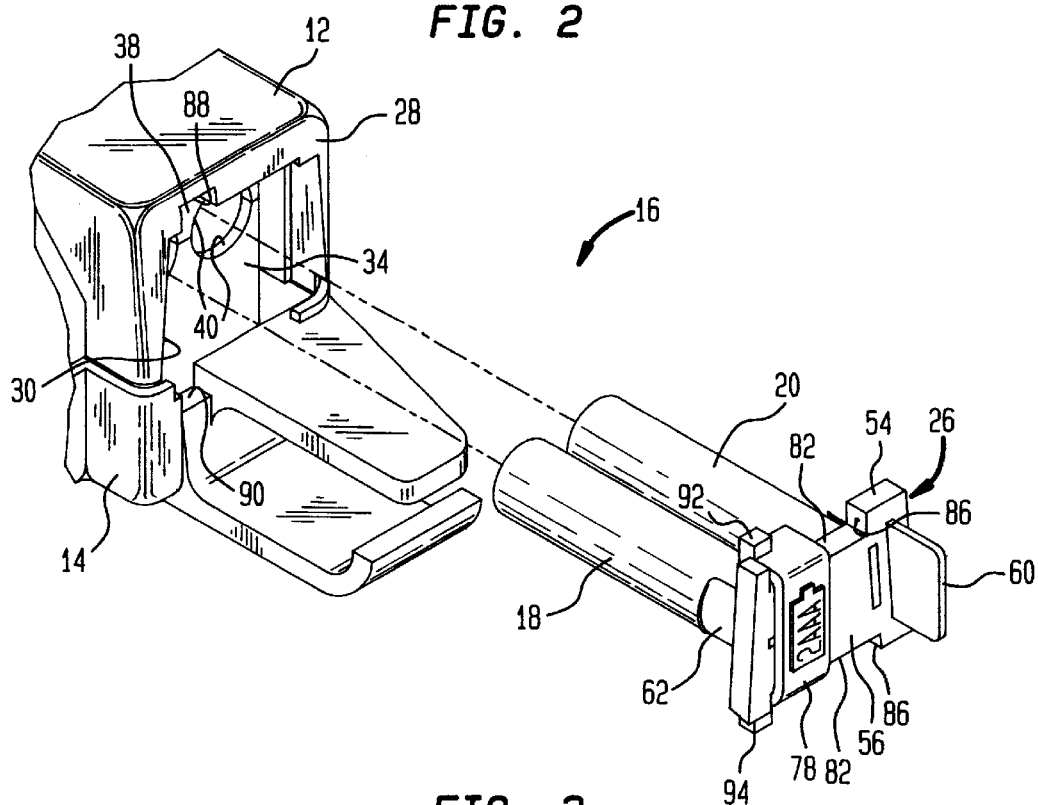
FIG. 2 is a perspective view showing a preferred embodiment of the inventive battery holder in a corner of the module shown in FIG. 1 with the carrier holding a pair of battery cells and removed from the housing.
Figure 3:
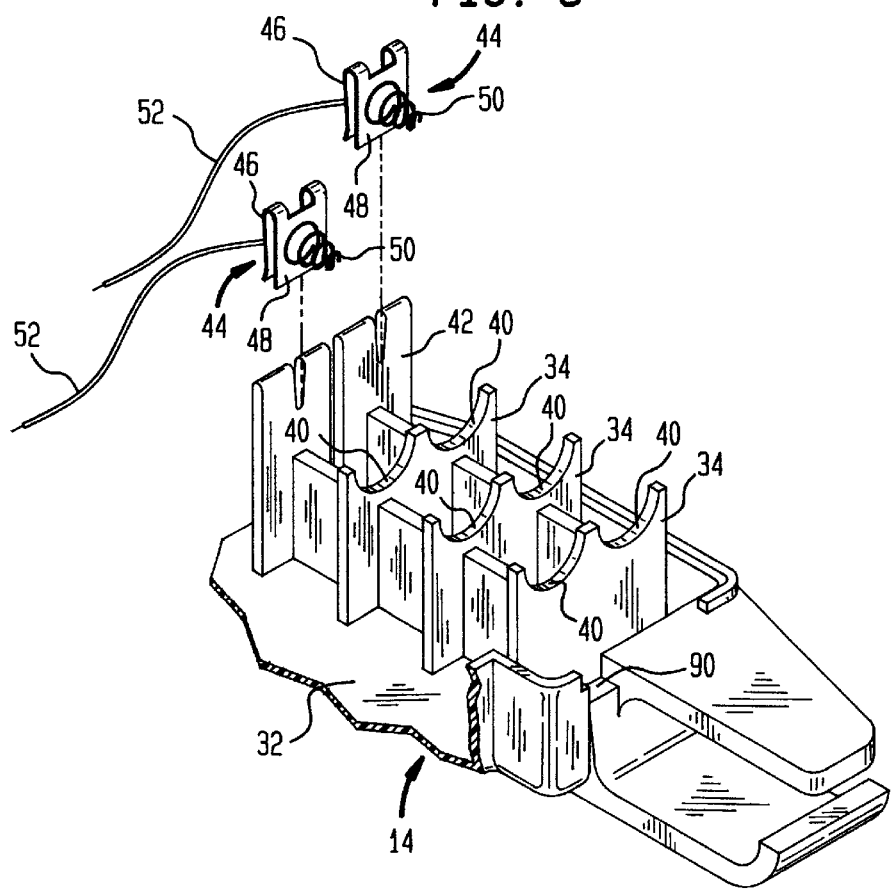
FIG. 3 is an exploded partial perspective view showing the lower housing portion of the inventive battery holder shown in FIG. 2.
Figure 4:
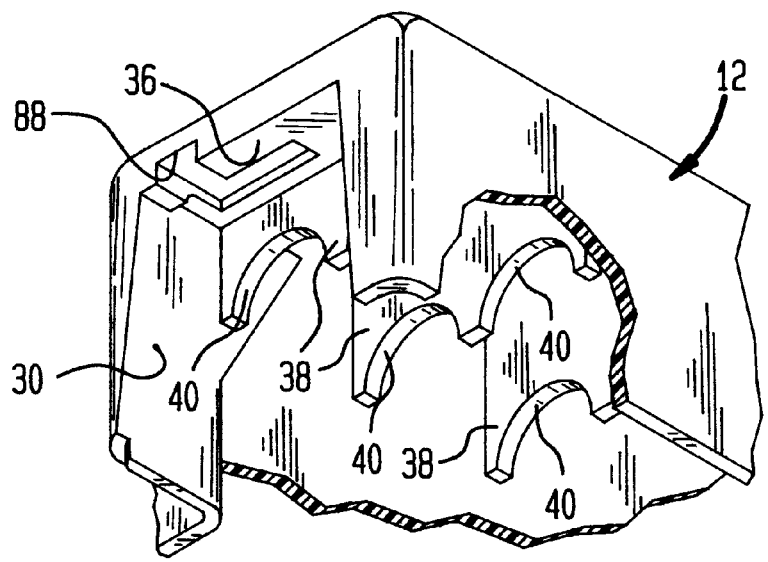
FIG. 4 is a partial perspective view showing the upper housing portion of the inventive battery holder shown in FIG. 2.

The inventive battery holder 16 has two main parts. The first part is a housing which, in the context of the illustrative embodiment, is formed as part of the module 10 upper and lower housing parts 12, 14, and a battery carrier 26. To form the housing of the battery holder 16, the upper housing part 12 is formed with an exterior wall 28 having an access opening 30. The access opening 30 is sufficiently large to allow the pair of battery cells 18, 20 to pass therethrough in a longitudinal direction when they are held side-by-side, as shown in FIG. 2. The upper and lower housing parts 12, 14 are further formed with interior support structure defining a pair of guide channels each for guiding and substantially surrounding a respective one of the battery cells 18, 20 when the pair of battery cells 18, 20 are within the housing in side-by-side relation to each other. Specifically, as shown in FIG. 3, the lower housing part 14 has a lower wall 32 and is formed with a plurality of parallel planar support walls 34 which extend upwardly from the lower wall 32 and are orthogonal to the longitudinal direction of the battery cells 18, 20. Similarly, as shown in FIG. 4, the upper housing part 12 has an upper wall 36 from which a plurality of parallel planar upper support walls 38 depend. The support walls 38 are likewise orthogonal to the longitudinal direction of the battery cells 18, 20. Further, each of the walls 34 is coplanar with a respective one of the walls 38 and the walls 34, 38 all terminate at a plane which diametrically bisects the pair of side-by-side battery cells 18, 20. Still further, each of the walls 34, 38 is terminated by a pair of side-by-side arcuate cut-outs 40 in the planes of the respective walls 34, 38. The cut-outs 40 together define a pair of guide channels, one for each of the battery cells 18, 20. Each of the cut-outs 40 subtends an angle of no more than 180°, and preferably is semi-circular to subtend a 180° angle.

The housing portion of the inventive battery holder 16 further includes an interior wall 42, shown in FIG. 3 as being split, extending upwardly from the lower wall 32 of the lower housing part 14 and situated inwardly of the guide channels defined by the support walls 34, 38. The interior wall 42 provides an inner limit to longitudinal travel of the pair of battery cells 18, 20. Mounted to the interior wall 42 are a pair of conductive contact elements 44. Each of the contact elements 44 is aligned with a respective one of the guide channels defined by the cut-outs 40 so as to engage an inward terminal of a battery cell in the respective guide channel. As shown, each of the contact elements 44 includes a resilient clip 46, bent into a U-shape, for securement to the wall 42. The clip 46 has a generally planar face 48 facing the access opening 30 and a spring contact 50 secured to the planar face 48, as by welding, crimping, or the like. Preferably, the spring contact 50 is a helical wire secured to the planar face 48 and tapering inwardly away from the face 48. In addition to providing conductive engagement with the terminals of the battery cells 18, 20, the spring contacts 50 yieldably bias the battery cells 18, 20 in a direction longitudinally outward from the battery holder housing. Attached to each clip 46 is a respective wire 52 which is utilized for connecting the backup batteries to circuitry on the printed wiring board of the module 10.

The other major component of the inventive battery holder 16 is the battery carrier 26. The function of the carrier 26 is to retain the pair of battery cells 18, 20 in parallel side-by-side relationship, cover the access opening 30, and interconnect the outward pair of battery terminals to maintain the pair of battery cells 18, 20 in series electrical connection. Thus, the carrier 26 includes a generally planar cover wall 54 having an outer periphery which is complemental to the periphery of the access opening 30. The cover wall 54 has a pair of opposed major surfaces 56, 58. A handle 60 is secured to the major surface 56 and a pair of clip members 62 are secured to the major surface 58 in a manner to be described hereinafter. Each of the clip members 62 is resilient and at least partially surrounds a respective one of the battery cells 18, 20 to frictionally engage and retain the respective battery cell.

To hold the clip members 62, the cover wall 54 is formed with a pair of lower wall segments 64 extending substantially orthogonally to the major surface 58. The clip members 62 are generally U-shaped with the base of the U being folded over so as to be secured to a respective lower wall segment 64 and the sides of the U being arcuate to conform to the shape of the battery cells 18, 20. Thus, each of the clip members 62 is centrally mounted to a respective lower wall segment 64 and subtends an angle of approximately 270°. The carrier 26 is further formed with a pair of upper wall segments 66 which are generally arcuate to conform with the shape of the battery cells 18, 20 and subtend an angle of no more than 90°. Thus, the ends of the battery cells 18, 20 are substantially completely surrounded by the combination of the clip members 62 and the upper wall segments 66 so that they are readily transported in the carrier 26 without requiring handling by the user.

The carrier 26 further includes a conductive contact plate 68 secured to the major surface 58 between the pair of clip members 62 and the major surface 58. The contact plate 68 extends across the pair of clip members 62 to engage and interconnect the terminals of the battery cells 18, 20 so that the battery cells 18, 20 are maintained in series electrical connection. Thus, a pin 70 is formed on the major surface 58 and the contact plate 68 is lanced at 72 so that it can be installed and retained on the pin 70. Further, the contact plate 68 is formed with a pair of domed areas 74, 76 to insure good surface contact with the terminals of the battery cells 18, 20.

To securely hold the carrier 26 to the housing of the battery holder 16, the carrier 26 is provided with a latch member 78 movably mounted on the cover wall 54. As shown, the latch member 78 is generally C-shaped and at the distal ends of its arms it has a pair of ramped camming members 80 facing each other. The cover wall 54 is formed with upper and lower recesses 82 over which the latch member 78 is snapped for installation. Thus, the latch member 78 is laterally slidable within the recesses 82 between extreme positions defined by abutments 84, 86 and maintained on the cover wall 54 by the camming members 80.

As shown, the access opening 30 has a substantially rectangular periphery and the exterior wall 28 of the housing is formed with an upper notch 88 and a lower notch 90 on the upper and lower sides, respectively, of the periphery of the access opening 30. The latch member 78 is accordingly formed with an upper projection 92 and a lower projection 94 sized to pass through the respective notches 88, 90. These projections 92, 94 are at the distal ends of the arms of the latch members 78 so that they are forwardly of the major surface 58 of the cover wall 54, as best shown in FIG. 6. As best shown in FIG. 4, the upper notch 88 is cut into the upper wall 36 of the upper housing part 12 and extends inwardly and laterally in an L-shape to provide a path for the upper projection 92 of the latch member 78. The lower notch 90 merely extends straight into the interior of the lower housing part 14.

Figure 5:
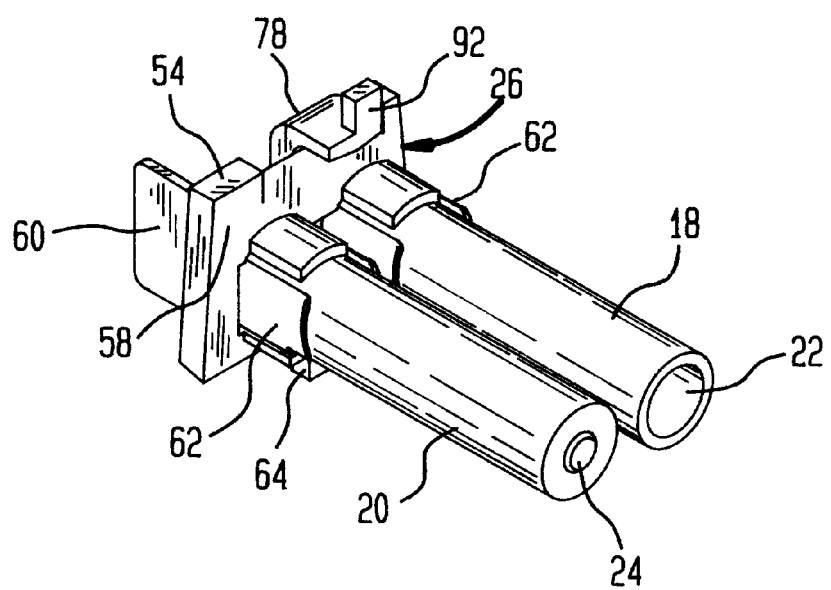
FIG. 5 is a perspective view showing the inner side of the carrier of the inventive battery holder shown in FIG. 2 with a pair of battery cells retained thereby.

In operation, a pair of battery cells 18, 20 are placed into the battery carrier 26, as shown in FIG. 5. The operator grasps the handle 60 and moves the carrier 26 so that the battery cells 18, 20 pass through the access opening 30 and into the guide channels defined by the cut-outs 40, as best shown in FIG. 2. The resilient clip members 62 retain the battery cells 18, 20 without assistance from the user. During this insertion operation, the latch member 78 is moved fully to the left, as viewed in FIG. 2, against the abutments 84. In this position of the latch member 78, the projections 92, 94 enter the notches 88, 90. The carrier 26 is moved forward until the battery cell terminals 22, 24 engage the spring contacts 50 and compress them, to insure good electrical contact. Forward movement of the carrier 26 is continued until the upper projection 92 is fully within the notch 88 and the lower projection 94 has passed the exterior wall 28 of the housing. At this time, the latch member 78 is slid to the right so that the upper projection 92 is within the lateral channel of the notch 88 and the lower projection 94 is behind the exterior wall 28 of the housing. Outwardly directed forces against the battery cells 18, 20 generated by the spring contacts 50 cause the projections 92, 94 to frictionally engage interior surfaces of the housing, thereby maintaining the latch member 78 in the latched position until the user exerts an overriding lateral force. Accordingly, the battery carrier 26 is held in position with the battery cells 18, 20 serially connected as backup batteries for the module 10.

When the user desires to replace the battery cells 18, 20, the latch 78 is moved to the left so that the projections 92, 94 are aligned with the notches 88, 90. The spring contacts 50 exert an outward force to separate the battery cells 18, 20 therefrom and the carrier 26 is then easily removed from the housing by grasping the handle 60.

The described battery holder meets all of the requirements of Underwriters Laboratory standard UL1950 without requiring a powering down of the overall system. Since the upper and lower housing parts 12, 14 and the cover wall 58, handle 60 and latch 78 are made of insulative material, during insertion and removal of the battery cells the user is not in contact with any conductive material, so the user is isolated from electric shock hazards. Further, when the battery carrier 26 is totally removed, access to the spring contacts 50 is severely restricted due to the support walls 34, 38 and the relatively small dimensions of the guide channels formed by the cut-outs 40. These cut-outs are dimensioned to satisfy the Underwriters Laboratory standard UL1950.

Accordingly, there has been disclosed an improved battery holder which allows a battery cell to be easily inserted into or removed from a housing while eliminating electric shock hazards to the user. While an illustrative embodiment of the present invention has been disclosed herein, it is understood that various modifications and adaptations to the disclosed embodiment will be apparent to one of ordinary skill in the art and it is intended that this invention be limited only by the scope of the appended claims.

What is claimed is:

1. A battery holder adapted to hold at least one battery cell, said at least one battery cell having a pair of terminals of opposite polarity, the holder comprising:
   a housing including:
      an exterior wall having an access opening sized to allow said at least one battery cell to pass therethrough in a longitudinal direction;
      interior support structure defining a guide channel for guiding and substantially surrounding said at least one battery cell when said at least one battery cell is within said housing;
      an interior wall situated inwardly of said guide channel and providing an inner limit to longitudinal travel of said at least one battery cell along said guide channel; and
      a pair of conductive contact elements mounted to said interior wall, each of said pair of contact elements adapted to be in electrical contact with a respective terminal of said at least one battery cell; and
   a carrier for retaining said at least one battery cell and for covering said access opening, said carrier including:
      a generally planar cover wall having an outer periphery which is complemental to the periphery of said access opening and having a pair of opposed major surfaces;

a handle secured to a first of said cover wall major surfaces;

at least one clip member secured to the other of said cover wall major surfaces, each of said at least one clip member being resilient and at least partially surrounding a respective one of said at least one battery cell to frictionally engage and retain the respective one of said at least one battery cell; and a latch member movably mounted on said cover wall;

wherein the latch member and the housing exterior wall surrounding the access opening are formed with cooperating structure so that:

a) when the latch member is moved to a first position relative to the cover wall the carrier is free to move in and out of the access opening with the at least one battery cell moving along the guide channel so that the at least one battery cell can be inserted into or removed from the housing; and b) when the latch member is moved to a second position relative to the cover wall the latch member and the cooperating structure of the housing exterior wall interfere to prevent the at least one battery cell from being inserted into or removed from the housing.

2. The holder according to claim 1 wherein each of said contact elements includes a spring to yieldably bias the at least one battery cell in a direction longitudinally outward from the housing.

3. The holder according to claim 2 wherein each of said contact elements includes a resilient clip secured to said interior wall, said resilient clip having a generally planar face on the side of said interior wall facing said access opening, and said spring includes a helical wire secured to said planar face and tapering inwardly away from said planar face.

4. The holder according to claim 1 wherein:

said latch member is substantially C-shaped and is slidable on said cover wall;

said access opening has a substantially rectangular periphery;

said housing exterior wall is formed with a pair of notches on opposed sides of the periphery of said access opening; and said latch member is formed with a pair of projections which extend beyond the periphery of said cover wall and inwardly of the cover wall other major surface, each of said projections being sized to pass through a respective one of said pair of notches;

whereby when the latch member is slid to the first position on the cover wall the carrier can be moved to effect insertion or removal of the at least one battery cell and when the latch member is slid to the second position on the cover wall after the at least one battery cell has been fully inserted in the housing the carrier is locked to prevent subsequent removal of the at least one battery cell from the housing.

5. The holder according to claim 1 wherein:

said cover wall is formed with a respective pair of wall segments extending inwardly of said housing from said cover wall other major surface for each of said at least one battery cell;

each of said pair of wall segments includes an upper arcuate wall segment and a lower wall segment, the upper arcuate wall segment subtending a circumferential angle of no more than 90°, the upper and lower wall segments being substantially equally spaced laterally from each other; and each of said at least one clip member is centrally mounted to a respective lower wall segment and subtends an angle of approximately 270°.

6. The holder according to claim 1 wherein the interior support structure includes a plurality of parallel planar support walls orthogonal to the longitudinal direction of the at least one battery cell and each terminated by a cut-out in its plane for defining the guide channel.

7. The holder according to claim 6 wherein each cut-out is arcuate and subtends an angle of no more than 180°.

8. The holder according to claim 1 wherein said housing further includes an upper housing wall and a lower housing wall and the interior support structure includes:

a first plurality of parallel planar support walls orthogonal to the longitudinal direction of the at least one battery cell and extending downwardly from the upper housing wall; and a second plurality of parallel planar support walls orthogonal to the longitudinal direction of the at least one battery cell and extending upwardly from the lower housing wall;

wherein each of the support walls in the first and second pluralities of support walls terminates at a plane which bisects the at least one battery cell and wherein each of the support walls is terminated by a cut-out in the plane of each of the support walls for defining the guide channel.

9. The holder according to claim 8 wherein each support wall extending downwardly from the upper housing wall is co-planar with a respective support wall extending upwardly from the lower housing wall.

10. The holder according to claim 1 wherein:

said at least one battery cell comprises a pair of cylindrical battery cells each having a respective pair of terminals of opposite polarity at longitudinally opposite ends of said each cell;

said carrier retains said pair of battery cells in side-by-side relationship;

said at least one clip member comprises a pair of clip members; and said carrier further includes a conductive contact plate secured to said cover wall other major surface between said pair of clip members and said cover wall other major surface, said contact plate extending sufficiently across said pair of clip members to engage and interconnect the outward terminals of a pair of battery cells retained by said pair of clip members so that said pair of battery cells are in series electrical connection.

11. In combination:

circuitry powered from a power source; and a battery holder for holding at least one battery cell to supply backup power to said circuitry in the event of failure of said power source, the battery holder having internal terminals for connecting the at least one battery cell to the circuitry and a cover for attaching the at least one battery cell thereto, the cover being selectively settable into a latching state and a releasing state, wherein when the cover is in the latching state the at least one battery cell is in contact with the internal terminals and when the cover is in the releasing state the cover and the at least one battery cell are removable from the battery holder to effect replacement of the at least one battery cell while the circuitry continues to be powered from the power source.

12. Apparatus comprising:

circuitry for drawing power from a power source; and a battery compartment having a cover for attaching at least one battery for use to supply backup power to the circuitry, wherein the cover is used for transporting the at least one battery into and out of the battery compartment while the circuitry is drawing power from the power source, the compartment and the cover having cooperating means for restricting a user from contacting the at least one battery unless the at least one battery is out of electrical contact with the circuitry;

whereby the at least one battery is replaceable without having to power-down the circuitry from the power source and electric shock hazard to the user is avoided.

* * * * *